United States Patent [19]

Gentet et al.

[11] 4,430,715
[45] Feb. 7, 1984

[54] SYSTEM FOR BRAKING AN AIRCRAFT TAXIING ON THE GROUND

[75] Inventors: Pierre Gentet, Colomiers; Alain Y. Geoffroy, Tournefeuille; Alain M. Caillebotte, Toulouse, all of France

[73] Assignee: Societe Nationale Industrielle Aerospatiale, Paris, France

[21] Appl. No.: 298,928

[22] Filed: Sep. 3, 1981

[30] Foreign Application Priority Data

Sep. 30, 1980 [FR] France ............................ 80 20889

[51] Int. Cl.³ .......................................... B60T 8/02
[52] U.S. Cl. .................................. 364/426; 303/92; 303/93; 244/111
[58] Field of Search ................ 303/92, 93, 103, 106, 303/109; 244/111; 364/426

[56] References Cited

U.S. PATENT DOCUMENTS

| 3,861,756 | 1/1975 | Arikawa | 303/106 |
| 3,874,743 | 4/1975 | Fleischer et al. | 303/92 |
| 4,006,941 | 2/1977 | De Vlieg | 303/103 |
| 4,007,970 | 2/1977 | Romero | 303/93 |

*Primary Examiner*—J. V. Truhe
*Assistant Examiner*—Saul M. Bergmann
*Attorney, Agent, or Firm*—Merriam, Marshall & Bicknell

[57] ABSTRACT

The present invention relates to a system for braking an aircraft taxiing on the ground. According to the invention, if an abnormality such as hydroplaning or bursting of a non-braked wheel is detected, the speed most representative of the real speed of the aircraft with respect to the ground is memorized. This memorized speed is regularly reduced to allow braking for the whole duration of the disturbance, avoiding locking or elimination of braking of the wheels of the main landing gear. The invention is more particularly applicable to the braking of wide-body aircraft.

10 Claims, 3 Drawing Figures

SYSTEM FOR BRAKING AN AIRCRAFT TAXIING ON THE GROUND

The present invention relates to a system for braking a vehicle, such as an aircraft taxiing on the ground. It concerns more particularly a braking system in which the speed of the vehicle is measured with the aid of at least one non-braked wheel thereof and which, in the event of hydroplaning or bursting of the tyre of this non-braking wheel, enables the non-skid device of the braked wheels of said vehicle to be maintained in operation. The invention therefore relates to the action of the devices for controlling the brakes of the main landing gear during the taxiing phases of an aircraft: landing or acceleration-stop upon take-off.

It is known, on the one hand, that, in these braking control devices, the non-skid device is intended to avoid locking at the braked wheels, i.e., the wheels of the main landing gear, and, on the other hand, that the braking control devices make it possible to establish a reference slide of said braked wheels with respect to at least one non-braked wheel of the aircraft, i.e. a wheel of the nose gear, by comparison of the speed of these braked wheels with the speed of this non-braked wheel.

The difference between these speeds determines the slide of the wheels of the main landing gear. Braking is generally controlled when the slide exceeds 20%.

If $V_a$ is the tangential speed of the non-braked wheels, i.e. the speed of the aircraft, and if V is the tangential speed of the braked wheels, the slide is determined by:

$$g = \frac{V_a - V}{V_a} = 1 - \frac{V}{V_a}$$

When the difference between $V_a$ and V becomes too great (for example if $V<0.85\ V_a$), the control devices control the debraking of the main landing gear.

On the other hand, in the event of hydroplaning of the non-braked wheels, the speed information $V_a$ given by at least one detector of the tachometer generator, phonic wheel, etc . . . type, is less than the real speed of the aircraft. The slide value received by the anti-skid device therefore decreases and may attain zero percent, thus eliminating the action of this device and may cause locking of the wheels of the main landing gear.

Similarly, in the event of bursting of at least one non-braked wheel, this results either in a reduction in the diameter of the wheel (taxiing on a flat tyre or on the wheel rim) and therefore an erroenous increase in the speed $V_a$, or the destruction of the rim and therefore a reduction of this speed $V_a$ to zero. In the second case, the effects are the same as in the case of hydroplaning, whilst in the first, on the contrary, the brakes are controlled in the sense of debraking.

It is an object of the present invention to overcome these drawbacks. It relates to a braking system in which, if an abnormality such as hydroplaning or bursting of a non-braked wheel is detected, the speed most representative of the real speed of the aircraft with respect to the ground is memorised. This memorised speed is regularly reduced to allow braking for the whole duration of the disturbance, avoiding locking or elimination of braking of the main landing gear.

In their U.S. Pat. No. 4,195,803 Applicants have already described a system for breaking a vehicle, particularly of an aircraft taxiing on the ground, comprising a non-skid device avoiding locking of the braked wheels and receiving speed information from at least one detector coupled to at least one non-braked of said vehicle, this earlier braking system being noteworthy in that, between said speed detector and said non-skid device, it comprises a correction device comprising, on the one hand, first means adapted to transmit to the non-skid device said speed information coming from said detector whenever the variations of this speed information with respect to time are less than a deceleration threshold representative of hydroplaning of said non-braked wheel and, on the other hand second means adapted, whenever said variations of the speed information are more than said threshold, to eliminate the action of said first means and to transmit, at each instant, to said non-skid device, decreasing speed information estimated from the value of said speed information at the moment when said hydroplaning of the non-braked wheel begins.

The present invention relates to a braking system of this type, but of which the correction device has a different structure, so as to be able to take into account the possible bursting of the tyre of a non-braked wheel.

To this end, according to the invention, the system for braking an aircraft comprising, on the one hand, a non-skid device which receives speed information from at least one first detector coupled to at least one non-braked wheel of said aircraft and furnishing an electrical magnitude representative of the speed thereof and which avoids locking of the braked wheels by servo-control of the slide and, on the other hand, a correction device disposed between said speed detector and said non-skid device and sensitive to at least one deceleration threshold representative of the hydroplaning of said non-braked wheel, is noteworthy in that it further comprises at least one second speed detector coupled to at least one braked wheel and furnishing an electrical magnitude representative of the speed thereof, as well as a source furnishing an electrical reference magnitude corresponding to a reference speed of the aircraft just before landing and in that said correction device comprises a selector of which the output is connected to said non-skid device and of which the two inputs are respectively connected to the outputs of a first or a second memory adapted to store an electrical magnitude and to reproduce it at two different rates of decrementation by action on a control member, the input of said first memory being connected to the first and to the second speed detector and to said source and its control member being connected to the output of the first of two comparators which cause said first memory to pass from its fast rate to its slow rate if the electrical magnitude at the output of the first detector is less than a predetermined fraction of the value of the electrical magnitude at the output of said first memory or if the variation of the electrical magnitude of the first detector is less than said threshold representative of hydroplaning whilst the input of said second memory is connected to the second speed detector as well as to said source and its control member is connected to the output of a third comparator, capable, when the ratio of the electrical magnitudes at the output of said first and second memories is higher than a threshold representative of a burst wheel, of simultaneously causing said second memory to pass from its fast rate to its slow rate and said selector to pass from its normal position, for which it connects the output of the first memory to the non-skid device, to its temporary position, for which it connects the output of the second memory to said non-skid device.

Thus, with the system according to the invention, if an abnormality (hydroplaning or bursting) is detected, the speed most representative of the real speed of the aircraft with respect to the ground is memorised. This speed appears as the one as a function of which the non-skid device is controlled and its representative value is regularly reduced to allow a braking for the whole duration of the disturbance avoiding the locking or loss of braking of the wheels of the main landing gear.

In the system according to the invention, it is considered that there is hydroplaning, when the deceleration of the nose gear wheel of the aircraft is greater, for example, than 10/m/s/s or when the speed of this wheel does not attain, for example, 80% of the speed memorised in the first memory. In this case, the speed information furnished to the non-skid device is allowed to decrease to the slow rate of, for example, 2/m/s/s.

Furthermore, it may be considered that there is bursting of the nose gear wheel when the speed memorised in the first memory exceeds by more than 50% for example the speed of the main landing gear wheels, possibly after a delay.

Hydroplaning can occur upon impact of the main landing gear on the ground and this is why it is necessary to employ the source producing a reference magnitude. To avoid the braking system triggering the safety device actuated in the case of bursting, the reference magnitude is also applied to the second memory.

In an embodiment of analog type, the memories are preferably equivalent to a circuit comprising a capacitor charged by the electrical magnitude to be stored and discharged by a current generator which can furnish two discharge intensities as desired. Such a circuit may, for example, comprise a differential amplifier comprising the capacitor between its negative input and its output, this negative output normally being biased by a bridge of resistors, which is associated with a constant potential difference allowing the discharge of the capacitor at the first rate and of which the common point serves as control member for receiving a control order allowing the discharge of the capacitor at the slow rate, whilst the positive input of said differential amplifier is connected to earth by a resistor.

It will be noted that, in the U.S. Patent mentioned hereinabove, the association of a current generator with a capacitor has already been used. However, in this prior patent, the discharge of the capacitor was effected only at one rate, which did not allow it to be used in the present invention.

The invention will be more readily understood on reading the following description with reference to the accompanying drawings, in which.

For carrying out the invention, a plurality of speed signals coming from a plurality of detectors (tachometer generators, phonic wheels, etc...) coupled with as many non-braked wheels, as well as a plurality of speed signals coming from a plurality of similar detectors coupled to as many braked wheels may be used. However, for the purposes of clarity and simplification, the following description of the invention given with reference to FIG. 3 will describe only one detector coupled to one braked wheel and only one detector coupled to one non-braked wheel.

Figure 1:
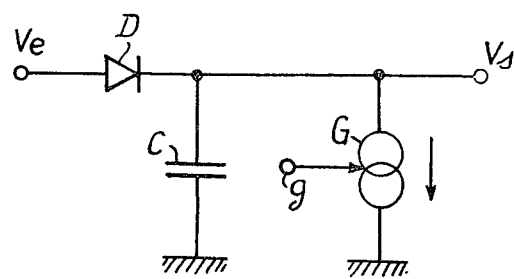
FIG. 1 shows the equivalent diagram of an analog memory used in the present invention.

Furthermore, to carry out the present invention, analog memories of the type described in the prior patent mentioned above, but improved in order to present two different discharge rates, are used. Each of these analog memories comprises (cf. FIG. 1) a constant current generator G associated with capacitor C, so that, if at the input of such a memory a voltage $V_e$ presenting a low impedance is applied to charge said capacitor C, the output voltage $V_s$ faithfully follows the input voltage $V_e$ during charge (corresponding to an acceleration of the aircraft), whilst, during discharge of the capacitor C (corresponding to a deceleration of the aircraft) it is one of the two currents (programmable due to a control gate g) of the current generator G which discharges the capacitor with a limited speed, corresponding to a deceleration threshold. In such an analog memory, the ratio of each of the two currents of the generator to the capacity of the capacitor is therefore such that the variations of the voltage at the terminals thereof as a function of time correspond to a deceleration threshold.

Figure 2:
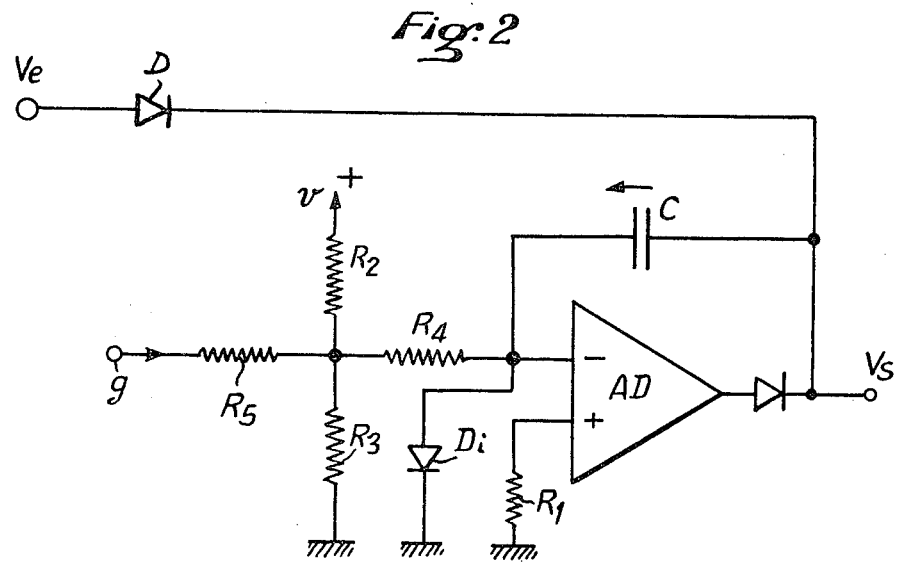
FIG. 2 shows the diagram of an embodiment of the analog memory of FIG. 1.

As shown in FIG. 2, the generator G may be constituted by a differential amplifier of which the positive input is connected to earth by a resistor $R_1$ and of which the negative input is normally biased by a positive voltage v, associated with a bridge of resistors $R_2$, $R_3$ and $R_4$. The capacitor C is in parallel on the amplifier AD between its negative input and output and the charging circuit is closed by the diode $D_i$. The common point of the bridge $R_2$, $R_3$ and $R_4$ is connected to the gate g by a resistor $R_5$. Thus, when no potential is applied at g, the discharge of capacitor C is effected at the rate imposed by the voltage v. On the other hand, when a potential is applied at g, the discharge of the capacitor C is effected at the rate imposed by the combination of the voltage v and said potential.

The system according to the present invention makes it possible, from at least one signal of voltage $V_d$ representative of the tangential speed of at least one non-braked wheel (nose gear) and furnished by a tachometric detector mounted thereon, and from at least one signal of voltage V representative of the tangential speed of at least one braked wheel (main landing gear) and also furnished by a tachometric detector, to elaborate a signal of voltage $V_a$ representative of the tangential speed of the aircraft, which enables the reference slide $g_c$ of the non-skid device to be fixed. When no slide is produced between the ground and the wheels of the nose gear, $V_a = V_d$.

Figure 3:
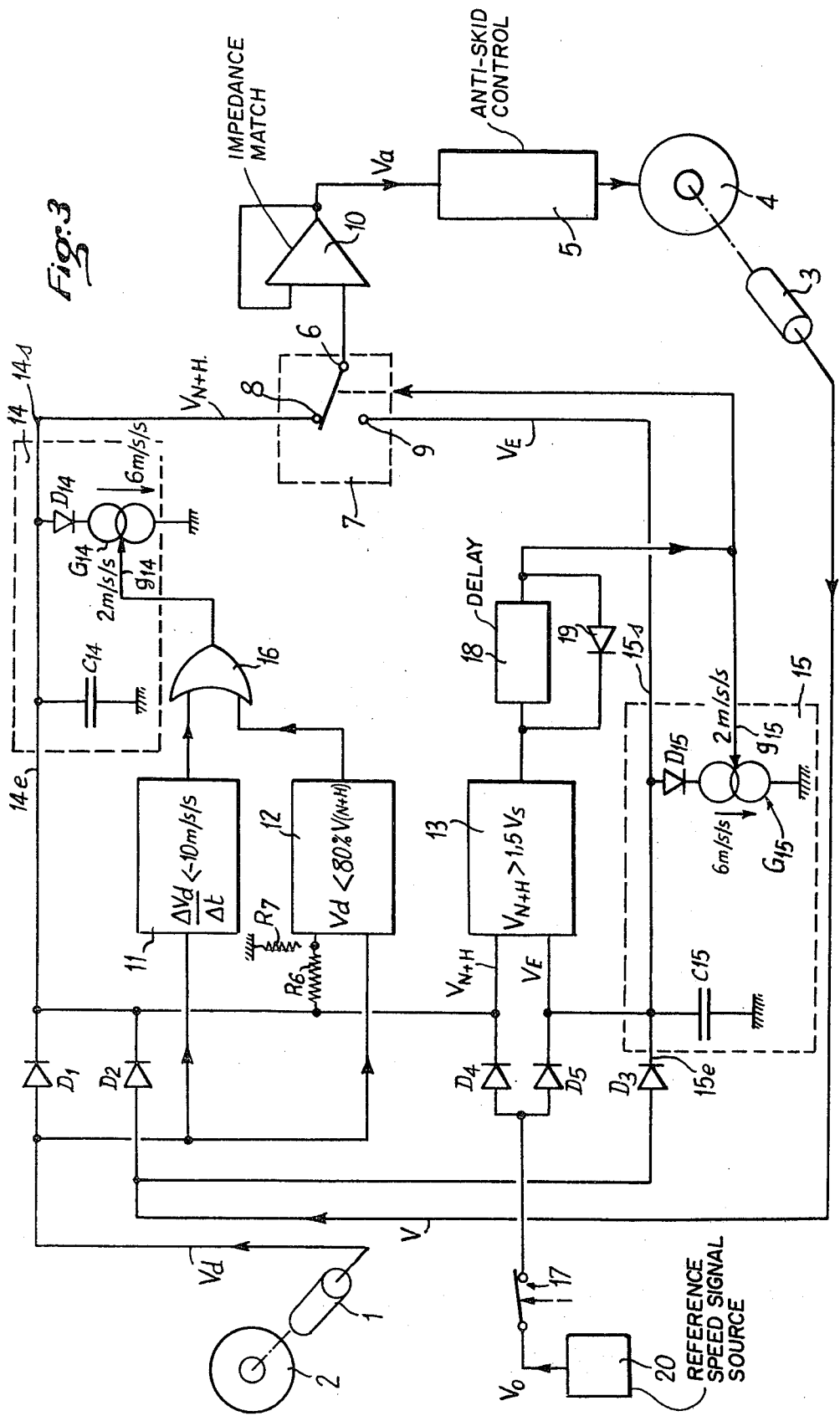
FIG. 3 shows the block diagram of the braking system according to the invention.

The device according to the invention, shown in FIG. 3, comprises a first tachometric detector 1, associated with a non-braked wheel 2 of the nose gear, and a second tachometric detector 3, associated with a braked wheel 4 of the main landing gear. The tachometric detectors 1 and 2 respectively furnish at their outputs, a voltage $V_d$ or V, representative of the tangential speed of the corresponding wheel 2 or 4.

The wheel 4 is braked, monitored by a known anti-skid control device 5, receiving its control signal from the single output 6 of a selector 7 with two inputs 8 and 9, via an impedance matcher 10. The input 8 of the selector 7 receives a voltage $V_{N+H}$ corresponding to the normal braking conditions or in the event of hydroplaning of the wheel 2, whilst the input 9 of said selector 7 receives a voltage $V_E$ corresponding to braking in the event of bursting of the wheel 2. Thus depending on the position of the selector 7, the voltage $V_a$ is formed by the voltage $V_{N+H}$ or by the voltage $V_E$.

The device according to the invention further comprises three comparators 11, 12, 13 and two analog memories 14 and 15.

The comparator 11 is connected to the detector 1 associated with the non-braked wheel and allows the comparison of the variation in time of signal $V_d$ with a signal representative of a deceleration of $-10$ m/s/s. This latter value has been chosen since, for a modern transport aircraft taxiing upon landing, it may be considered that there is hydroplaning, when the deceleration of the non-braking wheels is greater than or equal thereto.

Similarly, the comparator 12 is connected to the detector 1 and allows the comparison of said signal $V_d$ with a signal 0.8 $V_{N+H}$, obtained due to a bridge of resistors $R_6$, $R_7$, connected to the input 8 of the selector 7, through the memory 14.

The analog memory 14 comprises an input 14e and an output 14s, connected to each other, a capacitor $C_{14}$ and a current generator $G_{14}$ controlled by its gate $g_{14}$. The capacitor $G_{14}$ is connected between the inputs 14e and 14s on the one hand, and earth, on the other hand. The current generator $G_{14}$ is mounted in parallel on the capacitor $C_{14}$, via a diode $D_{14}$. The input 14e of the analog memory 14 is connected, through a diode $D_1$ to the detector 1, so that it receives the signal $V_d$. The output 14s is connected to the input 8 of the selector 7.

The outputs of the comparators 11 and 12 are connected to two inputs of a logic gate 16 or OR type, of which the output is connected to the conntrol gate $g_{14}$ of the current generator $G_{14}$.

Furthermore, the output of the detector 3 is connected, by a diode $D_2$ to the common point of the diode $D_1$ and of the input 14e of the memory 14.

The analog memory 15 comprises an input 15e and an output 15s, connected to each other. The input 15e receives the signal V from the detector 3 through a diode $D_3$. The output 15s is connected to the input 9 of the selector 7. The memory 15 comprises a capacitor $C_{15}$ disposed between the input 15e and the output 15s on the one hand, and earth on the other hand. This memory 15 further comprises a controlled current generator $G_{15}$, mounted in parallel on the capacitor $C_{15}$, via a diode $D_{15}$.

The comparator 13 may receive on its inputs, on the one hand the signal $V_{N+H}$, due to a link at the point common to $D_1$, $D_2$ and 14e and on the other hand the signal $V_E$ due to a link at 15e and 15s. Moreover, said inputs of the comparator 13 receives, via respective diodes $D_4$ and $D_5$ and a switch 17, the signal $V_o$ of a source 20, representative of a reference speed, for example equal to 50 m/s. The switch 17 is a contactor mounted on a main gear shock absorber, closed when said absorber is not loaded and open in the contrary case. The output of the comparator 13 is connected, via a delay device 18, inversely shunted by a diode 19, on the one hand to the control gate $g_{15}$ of the generator $G_{15}$, on the other hand to the control of the selèctor 7.

The system according to the invention operates as follows.

When the aircraft prepares to land, the pilot brings out the landing gear. During this phase of flight with the landing gear in emerged position, the contactor 17 is closed, so that the voltage $V_o$ is applied to the memories 14 and 15 respectively via diodes $D_4$ and $D_5$. The voltage $V_o$ is therefore found again on the inputs 8 and 9 of the selector 7. In this case, $V_{N+H}=V_E=V_a=V_o$, the selector 7 connecting the input 8 to output 6. Due to the value chosen for $V_o$, the non-skid control device 5 sends the order for complete debraking to the braked wheel 4, so that, even if the pilot presses on the brake pedals, the wheel 4 can rotate at speed at the moment when it makes contact with the ground.

When the wheel 4 touches the ground (the nose gear wheel 2 still being in the air), the contactor 17 opens and the voltage $V_o$ disappears from the input of the memories 14 and 15. The wheel 2 of the nose gear not yet being in contact with the ground, the result is that $V_d=0$. Consequently, the comparator 12 detects that $V_d$ is less than 80% of $V_{N+H}$ (i.e. at that moment less than 80% of $V_o$), so that, through the gate 16, and via the generator $G_{14}$, it obliges the voltage $V_{N+H}$, and therefore the voltage $V_a$, to decrease to a rate corresponding for example to a deceleration of 2 m/s/s.

However the memory 15 being charged at $V_E=V_o$ causes $V_E$ to decrease to a rate corresponding to a deceleration of 6 m/s/s, as the comparator 13 has noticed that $V_{N+H}$ is then not greater than 1.5 $V_E$ and does not send an order to the generator $G_{15}$.

Thus, the two voltages at the inputs of the comparator 13 decrease at very different rates. For the comparator 13 to trip, $V_{N+H}$ should become greater than 1.5 $V_E$, which corresponds to the time t necessary to attain a difference of speed $V_{N+H}-V_E=0.5\ V_o$, or if $V_o=50$ m/s, $V_{N+H}-V_E=25$ m/s.

In view of the difference in decrement rate of $V_{N+H}$ and of $V_E$, this difference in speed is obtained after the time:

$$t = \frac{25}{6-2} = 6 \text{ seconds.}$$

Now, as soon as the wheel 4 comes into contact with the ground, it immediately rotates at speed (except in the case of hydroplaning of wheel 4), so that the voltage V appears and exceeds the decreasing voltage $V_o$, before expiration of time t, the non-skid control device 5 continuing to give debraking orders. Thus, the comparator 13 does not trip. By the diodes $D_2$ and $D_3$, the voltage V, increasing and greater decreasing than $V_o$, is applied to the memories 14 and 15 which are charged at the value V (the highest value) so that $$V_{N+H}=V_a=V_E=V$$

is then obtained.

Without braking, these voltages decrease according to the natural deceleration of the aircraft beginning to taxi on the ground. As soon as braking is applied, V is allowed (by the control device 5) to decrease by 2 m/s/s and the same therefore applies to $V_{N+H}$, $V_a$ and $V_E$.

At that moment, the nose gear of the aircraft not yet being in contact with the ground, $V_d=0$. The comparator 12 therefore detects $V_d<80\%\ V_{N+H}$ and obliges, via the gate 16 and the generator $G_{14}$, $V_{N+H}=V$ to decrease to a rate corresponding to 2 m/s/s. On the other hand, the comparator does not detect that $V_{N+H}>1.5$, so that, in memory 15, $V_E=V$ decreases to a rhythm corresponding to 6 m/s/s.

Thus, there is difference again in the decrement rate of the voltage at the input of the comparator 13. In the particular case of landing being effected at the speed of 50 m/s, the time of stall should be less than 6 seconds (calculated similarly to the preceding time t), failing which the selector 7 would pass from position 6-8 to position 6-9 and the control device 5 would allow a high braking speed, without the possibility of locking.

However, the stall time is largely shorter than these 6 seconds, so that the selector 7 remains in position 6-8. The wheel 2 having come into contact with the ground during stall, the detector 1 furnishes a voltage $V_d$ which increases rapidly until it exceeds 80% of $V_{N+H}$.

The comparator 12 therefore stops controlling the generator $G_{14}$ and $V_{N+H}$ is allowed to pass from the decrement rate corresponding to 2 m/s/s to the rate corresponding to 6 m/s/s.

Thus, at the inputs of the comparator 13, an identical decrement rate is found for $V_{N+H}$ and for $V_E$.

Furthermore, the voltage $V_d$ coming from a non-braked wheel 2 is rapidly equal to, then exceeds the decreasing voltage V coming from the braked wheel 4. Through the diode $D_1$, the increasing voltage $V_d$ is applied to the analog memory 14 which is charged at this value so that now $V_{N+H} = V_a = V_d$.

The comparator 13 therefore receives at its inputs:
the voltage $V_{N+H} = V_d$ of memory 14, allowed to decrease to a rate corresponding to 6 m/s/s;
the voltage of the memory 15, $V_E = V$, also decreasing to the rate of 6 m/s/s.

As at the maximum slide allowed by the anti-skid control device 5 must not exceed 20%, the condition $V_{N+H} > 1.5 V_E$ cannot be produced and the voltages $V_{N+H} = V_d$ and $V_E = V$ therefore decrease to the rate of 6 m/s/s for the whole duration of braking.

Thus, under normal braking conditions, the selector 7 remains in position 6-8.

If, during braking, the phenomenon of hydroplaning affects wheel 2, the voltage $V_d$ undergoes a sudden deceleration, exceeding 10 m/s/s and detected by the comparator 11. Following this sudden deceleration, the diode $D_1$ isolates the memory 14 from detector 1 and the comparator 11 controls the generator 14 for the decrement rate to become 2 m/s/s and no longer 6 m/s/s. This new rate of 2 m/s/s is found on the speed of the wheel 4 because of the slide servo-control g due to the anti-skid device 5.

The comparator 13 therefore receives at its inputs:
the voltage $V_{N+H}$ decreasing at a rate of 2 m/s/s
the voltage V decreasing substantially at a rate of 2 m/s/s,
the slide servo-control allowing only a difference of 20% between these two voltages.

Thus, the comparator 13 does not detect a ratio higher than 150% and does not trip. The selector 7 remains in position 6-8, so that $V_a$ remains equal to $V_{N+H}$.

It will be noted that the comparator 13 then allows a decrement of 6 m/s/s at the output 15. In fact, this decrement is only 2 m/s/s due to the decrease in the speed of the wheel 4, under the action of device 5.

In the course of hydroplaning, the difference between the speed of the wheel 2 and the speed of wheel 4 exceeds 80% and the comparator 12 confirms the rate of deceleration of 2 m/s/s on the memory 14.

At the end of hydroplaning, the difference between $V_d$ and $V_{N+H}$ is annuled and the comparators 11 and 12 allow decrement rate of 6 m/s/s on the memory 14 and therefore on the voltage $V_a$.

In case of locking of the wheel 4, the voltage V decreases very quickly and the diode $D_3$ isolates memory 15 from the detector 3, if the decrement is greater than 6 m/s/s. On the other hand, the memory 14 continues to receive voltage $V_d$.

The conditions at the input of the comparators 11 and 12 are such that they allow a decrease to a rate of 6 m/s/s on the memory 14.

The comparator 13 receives at its inputs:
the voltage $V_{N+H}$ of the memory 14 equal to $V_d$
the voltage $V_E$ of the memory 15, equal to V at the origin of the lock and decreasing to the rate of 6 m/s/s.

When the difference between these two voltages is such that the inequality $V_{N+H} > 1.5 V_E$ is made, the selector 7 passes into position 6-9 with a delay to the device 18 and the braking control functions with the memory 15.

In the event of the tyre of wheel 2 bursting, the speed of this wheel, and therefore the voltage $V_d$, increase, this bringing about an increase in the voltage $V_{N+H}$ memorised at 14. The comparators 11 and 12 continue to allow a decrease to 6 m/s/s for the voltage $V_{N+H}$, which is equal to the voltage $V_d$ furnished by the detector 1, associated with the wheel 2 rolling on the flat tyre or on the rim of said wheel. Upon the appearance of the overspeed of $V_d$, $V_a$ increases, with the result that the control device debrakes the wheel 4.

The comparator 13 receives:
the voltage $V_{N+H}$ greater than the normal voltage $V_d$ memorised at 14
the voltage $V_E$ of the memory 15 equal to the voltage V associated with the wheel 4.

With normal braking, $V_{N+H}$ is greater than $V_E$. In this case, $V_{N+H}$ is greater than $V_N$ corresponding to the normal braking, so that the condition $V_{N+H} > 1.5 V_E$ is produced. The comparator 13 therefore trips and, with the delay due to the device 18, controls the memory 15 at the decrement rate of 2 m/s/s and the passage of the selector to position 6-9. The difference of 50% between $V_d$ and V being maintained, braking terminates with the memory 15, at the rate of 2 m/s/s. It will be noted that at the moment of trip of the selector 7, the voltage $V_E$ corresponds to the speed of the aircraft.

If the rim of the wheel 2 breaks, the voltage $V_d$ disappears and the conditions of hydroplaning described hereinabove are encountered again. The memory 15 maintains a speed $V_{N+H}$ greater than the real speed of the aircraft, so that the condition $V_{N+H} > 1.5 V_E$ still holds and the selector 7 remains in position 6-9.

It has been assumed in the foregoing, for purposes of simplification, that the signals $V_d$ and V came from one wheel. In fact, these signals may result from the combination and/or the selection of a plurality of signals emitted by a plurality of detectors 1 or 3 associated with a plurality of non-braked wheels 2 or braked wheels 4.

The detectors 1 and 3 preferably comprise phonic wheels delivering a signal of which the frequency is proportional to the speed of the corresponding wheel and associated with a frequency voltage converter.

I claim:
1. System for braking an aircraft comprising, on the one hand, a non-skid device which receives speed information from at least one first detector coupled to at least one non-braked wheel of said aircraft and furnishing an electrical magnitude representative of the speed thereof and which avoids locking of the braked wheels by servo-control of the slide and, on the other hand, a correction device disposed between said speed detector and said non-skid device and sensitive to at least one deceleration threshold representative of the hydro-planing of said non-braked wheel, wherein it further comprises at least one second speed detector coupled to at least one braked wheel and furnishing an electrical magnitude representative of the speed thereof, as well as a source furnishing an electrical reference magnitude corresponding to a reference speed of the aircraft just before landing and wherein said correction device comprises a selector of which the output is connected to said non-skid device and of which the two inputs are respectively connected to the outputs of a first or a second memory adapted to store an electrical magnitude and to reproduce it at two different rates of decrementation by action on a control member, the input of said first memory being connected to the first and to the second speed detector and to said source and its control member being connected to the output of two comparators which cause said first memory to pass from its fast rate to its slow rate if the electrical magnitude at the output of the first detector is less than a predetermined fraction of the value of the electrical magnitude at the output of said first memory or if the variation of the electrical magnitude of the first detector is less than said threshold representative of hydro-planing, whilst the input of said second memory is connected to the second speed detector as well as to said source and its control member is connected to the output of a third comparator, capable, when the ratio of the electrical magnitudes at the outputs of said first and second memories is higher than a threshold representative of a burst wheel, of simultaneously causing said second memory to pass from its fast rate to its slow rate and said selector to pass from its normal position, for which it connects the output of the first memory to the non-skid device, to its temporary position, for which it connects the output of the second memory to said non-skid device.

2. The system of claim 1, in which each memory is analog and equivalent to a circuit comprising a capacitor charged by the electrical magnitude to be stored and discharged by a current generator, wherein said current generator may furnish two discharge intensities as desired.

3. The system of claim 2, wherein each analog memory comprises a differential amplifier comprising a capacitor between its negative input and its output, this negative input normally being biased by a bridge of resistors which is associated with a constant potential difference allowing discharge of the capacitor at the rapid rate and of which the common point serves as control member for receiving a control order allowing discharge of the capacitor at the slow rate, whilst the positive input of said differential amplifier is connected to earth by a resistor.

4. The system of claim 1, wherein a contactor opening when the braked wheel touches the ground is disposed between said source furnishing the electrical reference magnitude and said correction device.

5. The system of claim 1, wherein said predetermined fraction is of the order of 80%.

6. The system of claim 1, wherein the threshold representative of the hydroplaning corresponds to a deceleration of the order of 10 m/s/s.

7. The system of claim 1, wherein the value of the ratio of the electrical magnitudes at the outputs of said first and second memories, considered as threshold representative of a burst wheel, is equal to about 1.5.

8. The system of claim 1, wherein a delay device is disposed between the output of the third comparator on the one hand and said analog memory and said selector, on the other hand.

9. The system of claim 1, wherein at least one of said detectors is a phonic wheel delivering a signal of which the frequency is proportional to the speed of the wheel, with which it is associated, and associated whith a frequency/voltage converter.

10. The system of one claim 1, wherein the non-skid device imposes a reference slide of the order of 20%.

* * * * *